Figure 1:
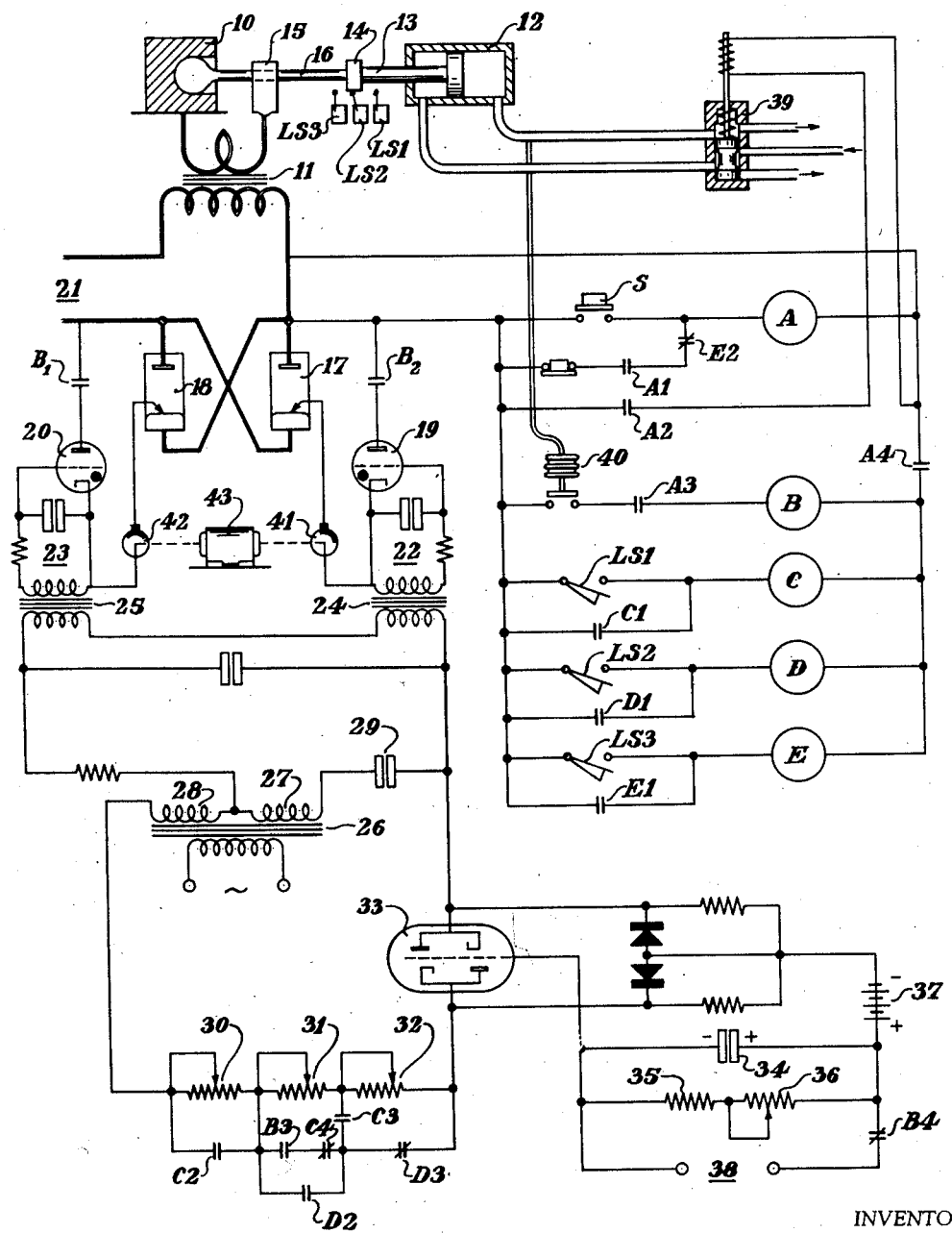

United States Patent Office 2,790,067
Patented Apr. 23, 1957

2,790,067
APPARATUS FOR HOT UPSETTING

Joseph J. Riley and Forbes A. Hurcomb, Warren, Ohio, assignors to The Taylor-Winfield Corporation, Warren, Ohio, a corporation of Ohio Application July 21, 1954, Serial No. 444,766

2 Claims. (Cl. 219—151)

This invention relates to metal working and forming, and more particularly to improvements in the method of and apparatus for the forming and working of metal parts wherein the parts to be worked or formed are heated by the flow of electric currents therethrough during the working or forming process.

As an overall object the present invention seeks to provide improved methods and apparatus for the so-called hot upsetting of metal parts wherein electrical currents are passed through a workpiece and pressure is applied thereto to soften and work or form the workpiece in the manner desired.

One of the more specific objects of the invention resides in the provision of an improved method of electric resistance hot upsetting of metal parts wherein the flow of current through the parts to be heated is varied in accordance with a predetermined schedule as the hot upsetting operation proceeds so that the article may be worked or formed under optimum conditions throughout the whole of the operation. During an upsetting operation the part to be upset is constantly changing in volume, geometric shape, resistivity, plasticity, and the like, and variations in any of these factors effect the optimum heating and pressure conditions under which the operation should be carried out. Thus, the invention seeks to provide an improved method of hot upsetting wherein the heating and pressure factors may be continuously or periodically varied to compensate for variations in the structure and composition of the workpiece. Our improved method, within the purview of the above object, contemplates varying the heating currents and/or upsetting pressures in accordance with time patterns or electrode movements, for example, or combinations of these and other factors as may best suit particular applications.

As another specific object, our invention seeks to provide an improved method of hot upsetting metal parts wherein during the first portion of the upsetting operation heating current flows at an initially low but progressively increasing value, up to some predetermined level for that portion of the operation, so that at the start of the operation, when contact between the workpiece and the confining or abutting electrodes may be poor, the effects of uneven current distribution are substantially negatived. The improved method is such that burns on the workpiece and/or electrodes are avoided, resulting in a superior finished product and in increased electrode wear as will be readily apparent.

In many upsetting operations there is provided a contoured confining sleeve or mold into which heated and softened workpieces are expanded, so that the finished product assumes the shape of the confining member. In many cases the finished shape is rectangular or irregular so that during the upsetting operation heating currents will be unevenly distributed throughout the workpiece, resulting in inferior metallurgical and mechanical properties. This is also true, of course, in the hot upsetting of workpieces which are initially of rectangular or irregular cross section. Accordingly, it is another of the specific objects of the present invention to provide an improved method for hot upsetting metal parts wherein heating current is supplied to the workpieces in measured pulses, followed by measured periods wherein no current flows, the arrangement being such that during the periods wherein no current flows in the workpiece heat may be transferred by conduction from the hotter to the cooler portions thereof so that substantial uniformity of heating is realized notwithstanding the irregular configuration of the original and/or finished piece.

Another object of the invention is the provision of improved apparatus, including electrical circuitry, for carrying out the improved methods set forth above.

The above and other objects and advantages of the invention will become apparent upon full consideration of the following detailed specification and accompanying drawing wherein are disclosed the improved methods of our invention and apparatus for carrying out such methods in an improved manner.

Figure 2:
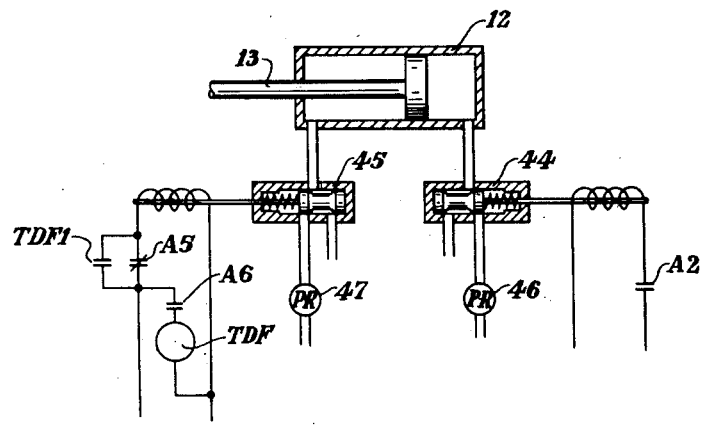
Figure 3:
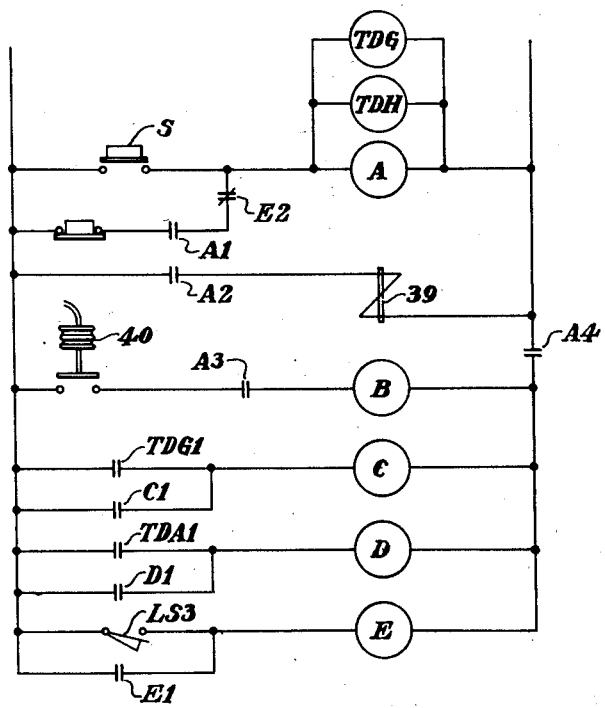

In the drawing:

Figure 1 is a schematic drawing of electric resistance hot upsetting apparatus for carrying out the methods of our invention and having improved features for carrying out such methods; and Figures 2 and 3 are schematic drawings of apparatus which may be incorporated into the apparatus of Figure 1 for carrying out slightly modified methods of operation.

Referring now to Figure 1, the reference numeral 10 designates the forming die or anvil of a hot upsetting machine, which forms a first electrode member, being connected to one terminal of the high amperage secondary winding of a transformer 11. Spaced from the anvil 10 is a hydraulic cylinder 12 having a movable piston member 13 provided with a ram or abutment 14 at its forward end. Between the abutment or ram 14 and the anvil 10 there is provided a second electrode member 15 which is arranged to have electrical contact with a workpiece 16 adjacent the anvil 10. The second electrode 15 is connected to the other secondary terminal of the transformer 11, as shown. Thus, when the transformer 11 is energized a current flows through the workpiece 16, from the electrode 15 to the anvil 10, softening the workpiece and causing it to conform to the shape of the anvil 10 under the pressure of the cylinder 12.

Preferably the second electrode 15 is movably mounted so that it may be retracted from the anvil during upsetting operations, as the upset end portion of the workpiece increases in size. This is, of course, in accordance with known practice in the art.

To energize the transformer 11 there may be provided a pair of mercury arc discharge devices 17 and 18, connected in anti-parallel relation, and each having an igniter circuit including a gaseous discharge device 19 or 20. The principal discharge devices or valves 17 and 18 are rendered conductive upon conduction in the auxiliary valves 19 and 20 so that current may pass from a source 21 to the transformer 11.

One of the undesirable features of hot upsetting, as heretofore practiced, has been that at the start of an upsetting operation, as the end of the workpiece 16 is first brought into contact with the anvil 10, poor electrical contact is had between the workpiece and the anvil so that depreciation of the anvil electrode was unduly high while the finished product often had burned or otherwise disfigured surface portions. To remedy this, it is contemplated in the method of our invention that during the initial period or portion of the operation heating currents will be initiated at a low value and gradually increased. The arrangement is such that the workpiece 16 is caused to conform properly to the surface of the anvil 10 under low heating current. And as the electrical contact gradually improves heating current is increased progressively to its full value.

Referring again to Figure 1, it will be observed that the auxiliary valves 19 and 20 are provided with grid circuits 22 and 23 respectively, including exciting transformers 24 and 25. The transformers 24 and 25 are connected in series and are energized by a phase shifting circuit including a transformer 26 having secondary windings 27 and 28. Secondary 27 connects through a capacitor 29 with the series connected grid circuit transformers 24 and 25, and secondary 28 connects the transformers 24 and 25 in a similar manner through a series of potentiometers 30—32 and through a vacuum tube 33 which is arranged to conduct in both directions. Various circuit paths, to be hereafter more fully described are arranged in shunting relation to the potentiometers 30—32 so that the total resistance connected in series with the secondary winding 28 may be varied over a wide range.

Vacuum tube 33 is of a grid controlled type, and is provided with a grid circuit including a capacitor 34, the positive side of which is connected to both cathodes of the tube 33 while the negative side is connected to the grid. The arrangement is such that when the capacitor 34 is in a charged condition a negative grid signal is applied to the tube 33 tending to maintain the same in a state of reduced conductivity. Positive bias voltage is furnished by means of any convenient source 37 so that when the capacitor 34 is in a discharged condition the tube 33 is fully conductive.

To charge the capacitor 34 there is provided a suitable source of charging potential 38, which is arranged to be disconnected from the capacitor at desired times, as will be more fully described.

In carrying out the method of our invention, wherein heating current is applied gradually to the workpiece 16 during the initial stages of the heating operation, we provide that the tube 33 will be initially substantially non-conductive so that substantially the whole of the output of transformer 26 will pass through secondary 27 and capacitor 29. Thus, the grid signal voltage applied to transformers 24 and 25 will be substantially out of phase with respect to the voltage of the source 21, and auxiliary valves 19 and 20 and main valves 17 and 18 will have minimum conductivity so that the passage of heating current to the workpiece 16 will be a minimum.

At the start of an upsetting operation, therefore, the capacitor 34 will be fully charged, placing a negative signal on the tube 33. The source of charging voltage 38 is cut off at the start of the operation, however, so that the charge upon capacitor 34 may be dissipated through a resistor 35 and potentiometer 36 in accordance with a timed relationship, so that the grid of the tube gradually becomes more and more positive, until it finally assumes the positive potential of the bias source 37. The tube 33, of course, becomes progressively more conductive during this period, until full conductivity is reached as the charge on capacitor 34 fully dissipates.

As the conductivity of tube 33 increases a progressively increasing portion of the output of transformer 26 passes through secondary 28 and one or more of the potentiometers 30—32 so that the resultant potential applied to the grid circuit transformers 24 and 25 progresses toward an in-phase relationship with the potential of the source 21, until a predetermined in-phase relationship is reached, as determined by the settings of potentiometers 30—32 and the particular one or ones thereof which are connected in series with secondary 28.

In the improved method of our invention, it is desired to shift the heat level periodically during the course of an upsetting operation so that heating conditions may be optimum with respect to the condition of the workpiece 16. Thus, it is in accordance with the teachings of our invention that the conductivity of the main valves 17 and 18 may be varied periodically to pass more or less current in accordance with predetermined schedules arranged to suit the particular upsetting operation which is being carried out. To effect this we provide a novel control circuitry including the plurality of potentiometers 30—32 and means to periodically shunt selected ones of the potentiometers out of the phase shifting network so that the conductivity of the valves 17 and 18 may be appropriately varied. This circuitry may be best described with reference to the operation of the apparatus as a whole, as described below.

To initiate an upsetting operation the operator closes a manual start switch S, energizing a relay A and closing contacts A1, A2, A3 and A4 thereof. Contact A1 closes a holding circuit in parallel with the switch S so that the relay A remains energized after release of the switch S. Contact A2 closes an energizing circuit for a solenoid operated valve 39, causing fluid to be directed into the outer end of cylinder 12 to move the workpiece 16 into engagement with the anvil 10. Contact A4 closes a line circuit leading to a plurality of other relays B, C, D and E so that these last mentioned relays may be energized at desired times. And contact A3 closes a separate circuit leading from a normally open pressure responsive switch 40 to relay B, so that the latter is energized upon closure of the switch 40.

After the workpiece 16 is brought into contact with the anvil electrode 10 pressure builds up in the outer end of cylinder 12 so that the pressure responsive switch 40 closes, energizing relay B, and closing contacts B1, B2 and B3 and opening contact B4. Contacts B1 and B2 close the anode-cathode circuits for auxiliary valves 19 and 20 so that the same may begin to conduct to cause heating current to pass to the workpiece 16. Contact B4 opens to disconnect the regulating capacitor 34 from its charging circuit 38 so that the initially low conductivity of tube 33 is progressively increased. And contact B3 closes to shunt out potentiometers 31 and 32. Thus, after relay B is energized heating current begins to flow at a progressively increasing rate, up to a predetermined value as determined by the potentiometer 30.

As the workpiece 16 softens adjacent the anvil electrode 10 the ram 14 advances, and as it does so a first limit switch LS1 is tripped, closing contacts LS1 to complete an energizing circuit for relay S.

When relay C is energized contacts C1, C2 and C3 are closed, while contact C4 is opened. Contact C1 establishes a holding circuit in parallel with contacts LS1. And contact C2 shunts potentiometer 30 out of the phase shifting circuit, while contacts C3 and C4 operate to connect the next potentiometer 31 into the phase shifting circuit. Thus, heating of the workpiece 16 continues at a varied heating level, according to the setting of the second potentiometer 31.

Upon continued forward or advancing movement of the ram 14 a second limit switch LS2 is tripped, closing contacts LS2 in the line circuit of relay D, energizing the same and causing contacts D1 and D2 to close and contact D3 to open. Contact D1 closes a holding circuit in parallel with contacts LS2; contact D2 shunts out potentiometer 31; and contact D3 opens the shunt circuit for potentiometer 32. Heating of the workpiece 16 then continues at a new heat level, as determined by the setting of the third potentiometer 32.

Still further movement of the ram 14 eventually causes a third limit switch LS3 to be tripped, closing contacts LS3 to energize relay E. Normally open contacts E1 of relay E close a holding circuit in parallel with contacts LS3, while normally closed contacts E2 open the holding circuit for the relay A, causing the latter to be de-energized. This, of course, opens the line circuits for relays B, C, D and E, and de-energizes valve 39, so that the ram 14 moves to its retracted position and the control circuitry is returned to its initial condition.

When employing hot upsetting processes in the working or forming of sections of irregular cross section, wherein the distribution of heating currents throughout the workpiece tends to be of a non-uniform character, it is desirable, in accordance with the teachings of our invention, to provide heating currents of a pulsating nature so that the distribution of heat may become more uniform during periods when no heating current is flowing. A highly simplified arrangement for carrying out this method of operation is illustrated in Figure 1, wherein rotatable switches 41 and 42 are incorporated into the igniter circuits for the main valves 17 and 18. The switches are arranged so that upon rotation thereof the igniter circuits for the respective valves 17 and 18 will be completed for a portion of each revolution and will be open for the remaining portion. Thus, whereas normally the valves 17 and 18 would conduct continuously at a predetermined level determined by the condition of the associated phase shifting circuit, when switches 41 and 42 are rotating the current will flow in timed pulses, at a pre-set heat level, followed by timed periods when no current flows.

In the illustrated circuit a motor 43 is employed to rotate the switches 41 and 42 at a predetermined speed to obtain pulsations of current of various desired durations.

Of course, it will be clearly understood, that various electronic or other arrangements may be employed for obtaining a pulsating current flow in the manner desired. For example, an electronic system of the type disclosed in the co-pending application of Joseph J. Riley and Clayton E. Stambaugh, Ser. No. 424,696, filed April 21, 1954, may be suitably adapted for hot upsetting processes whereby to obtain a current flow of a pulsating nature, while providing for independent variation of the heating and non-heating periods.

In Figure 2 of the drawing there is shown a modified ram actuating control which may be incorporated into the apparatus of Figure 1 so that a slightly modified method of operation may be carried out. In the modified arrangement, valve 39, of Figure 1, is replaced by separate valves 44 and 45 connecting the outer and inner ends respectively of the cylinder 12 with a source of pressure fluid. In connection with the valves 44 and 45 there are provided pressure reducing or regulating valves 46 and 47 respectively so that the pressure in one end of the cylinder may be varied with respect to the pressure in the other end.

In the contemplated method of operation valve 44 is energized at the start of an upsetting operation to cause the piston 13 to move forwardly to bring the workpiece 16 into initial high pressure contact with the anvil electrode 10, the purpose being to establish a good initial electrical contact between the workpiece 16 and anvil electrode 10 to avoid burning of one or both of these members as often occurs under prior practices. After a predetermined time, wherein the workpiece 16 is softened and caused to make good electrical contact with the anvil 10, the second valve 45 is energized to direct fluid into the opposite end of cylinder 12 at a reduced pressure. Thus, the pressure in the outer end of the cylinder 12 is opposed by the lesser pressure in the inner end of the cylinder, so that the piston 13 continues its forward movements under a substantially reduced effective pressure.

As will be readily understood, the above method of operation may be used as more or less of a substitute for the first described method wherein heating current is gradually increased from a low to a normal operating level through the action of capacitor 34 and vacuum tube 33. However, it will also be understood that both methods may be employed at the same time, each to complement the other. Moreover, it will be further understood that provisions may be readily made for the further variation of operating pressure at various stages of the upsetting operation where necessary or desirable for particular applications.

Referring again to Figure 2, the valve 44 is provided with an energizing circuit including contact A2 of relay A, whereby the valve 44 is operated immediately upon the closing of start switch S. Valve 45 is provided with an energizing circuit including a normally closed contact A5 of relay A, so that valve 45 is normally energized to maintain the piston 13 in a retracted position. However, when an upsetting operation is initiated contact A5 opens and the inner end of cylinder 13 is exhausted to permit the application of an initially high ram force, as described. Connected in parallel with the operating coil of valve 45 is a time delay relay TDF, the energizing circuit of which includes normally open contacts A6 of relay A. Thus, when relay A operates to de-energize the valve 45 the time delay relay TDF is energized. After a predetermined time interval has elapsed relay TDF operates, closing contacts TDF1 which are connected in parallel with normally closed contacts A5. At this time valve 45 is re-energized and pressure is again admitted to the inner end of cylinder 12 so that further upsetting of the workpiece 16 takes place under a reduced or normal pressure in the manner described.

In Figure 3 there is shown a modified circuit arrangement which may be incorporated into the apparatus shown in Figure 1 whereby upsetting operations may be carried out under a slightly modified schedule. In the circuit of Figure 3 the limit switches LS1 and LS2 are replaced by time delay relays TDG and TDH which are connected in parallel with relay A. Thus, when the start switch S is closed, relays A, TDG and TDH are simultaneously energized. The initial portion of the upsetting cycle is carried on exactly as described with reference to Figure 1. However, after a predetermined time relay TDG operates, closing contacts TDG1 in the line circuit for relay C, energizing the latter and causing potentiometer 30 to be shifted out of, and potentiometer 31 to be shifted into the phase shifting circuit for auxiliary valves 19 and 20. Thus, it will be apparent that relay TDG performs the same function as limit switch LS1, of the apparatus of Figure 1, except that control is placed on a time basis rather than on a ram position basis.

Similarly, the second time delay relay TDH operates a predetermined time after relay TDG to cause shifting of potentiometer 31 out of, and potentiometer 32 into the phase shifting circuit, the relay TDH performing the same function as limit switch LS2.

When the upsetting operation has been completed, as indicated by the ram 14 being at an inner limit position, the limit switch LS3 is tripped to restore the apparatus to its initial condition, exactly as described with reference to the apparatus of Figure 1.

It should thus be apparent that we have fulfilled the several objects initially set forth. We have provided novel methods of hot upsetting metal workpieces whereby optimum heating and forming conditions may be realized under substantially all conditions.

Specifically, by our invention, burning or pitting of the anvil electrode and/or the workpiece is avoided by the gradual initial application of heating current and/or by suitably manipulating the working force applied to the workpiece so that a high force is applied during the critical initial stage of the operation.

In addition, our invention teaches the method of varying the heating level throughout the course of the upsetting operation so that variations in the size, shape and conductivity of the workpiece, as well as other important factors, may be taken into account and the upsetting procedures varied accordingly so that optimum or near optimum conditions prevail through the whole of the operation.

It will be understood, of course, that various further modifications may be made in the method and apparatus herein specifically described without departing from the

We claim:

1. In apparatus for hot upsetting a metal workpiece and including a pair of electrodes, means to supply electrical current to said electrodes, and movable means to apply pressure to said workpiece to deform the same; the improvement in said means to supply electrical current comprising means operative in response to movements of said movable means to vary the magnitude of current to said electrodes, said means to vary comprising a pair of electrical discharge valves connected in anti-parallel relationship, an ignitor circuit to control the firing of said valves, a phase shifting electrical circuit and a plurality of limit switches to be operated in succession during an upsetting operation, said switches being operative to adjust said phase-shifting electrical circuit, a vacuum tube, a capacitor and resistance bridge for controlling said tube, a plurality of potentiometers selectively rendered effective by said limit switches, said means to apply pressure comprising a fluid cylinder, separate fluid lines connecting the opposite ends of said cylinder, separate valves in said fluid lines, means to control said separate valves whereby to exhaust one end of said cylinder during initial portions of an upsetting operation whereby said means to apply pressure exerts a maximum force, and further means to control said valves whereby to apply fluid pressure to both ends of said cylinder during later portions of the upsetting operation whereby said means to apply pressure exerts a normal operating force.

2. In apparatus for hot upsetting a metal workpiece and including a pair of electrodes, means to supply electrical current to said electrodes, and movable means to apply pressure to said workpiece to deform the same; the improvement in said means to supply electrical current comprising means operative in response to movement of said movable means to vary the magnitude of current to said electrodes, said means to vary comprising a pair of primary electrical discharge valves connected in anti-parallel relationship, a pair of auxiliary valves adapted upon conduction to condition said primary valves for conduction, a phase shifting electrical circuit operative to impress a control signal on said auxiliary valves, said phase shifting circuit comprising a reactive element, a vacuum tube having an anode, a cathode and a control grid element and a plurality of potentiometers, a plurality of limit switches adapted to be operated in succession by said movable means during an upsetting operation, said potentiometers being selectively rendered effective by said limit switches, means to apply a control signal between said control grid and said cathode of said vacuum tube, said last mentioned means comprising a capacitor and a resistance element connected in parallel with each other and with respect to said cathode and said control grid element, a charging source normally adapted to charge said capacitor, and said limit switches operative upon energization to isolate said charging source from said capacitor whereby said capacitor begins to discharge through said resistance element.

References Cited in the file of this patent

UNITED STATES PATENTS

| | | |
|---|---|---|
| 1,961,256 | Spire | June 5, 1934 |
| 2,037,604 | Spire | Apr. 14, 1936 |
| 2,295,297 | Schneider | Sept. 8, 1942 |
| 2,298,937 | Green | Oct. 13, 1942 |
| 2,488,899 | Cooper | Nov. 22, 1949 |
| 2,577,163 | Spittler | Dec. 4, 1951 |
| 2,594,090 | Stadum | Apr. 22, 1952 |
| 2,640,134 | Doutt | May 26, 1953 |
| 2,665,360 | Hansen | Jan. 5, 1954 |
| 2,677,037 | Platte | Apr. 27, 1954 |
| 2,680,179 | Mase | June 1, 1954 |
| 2,727,969 | Platte | Dec. 20, 1955 |

FOREIGN PATENTS

| | | |
|---|---|---|
| 559,658 | Great Britain | Feb. 29, 1944 |